United States Patent [19]

Averbuch

[11] 3,897,772
[45] Aug. 5, 1975

[54] MACHINE FOR CUTTING PRECIOUS STONES

[76] Inventor: Joseph Averbuch, 10 Dizengoff St., Tel Aviv, Israel

[22] Filed: Nov. 12, 1974

[21] Appl. No.: 523,163

[52] U.S. Cl............................................. 125/30 R
[51] Int. Cl............................................... B28d 5/00
[58] Field of Search ....................... 125/30 R, 13 R

[56] References Cited
UNITED STATES PATENTS

| | | | |
|---|---|---|---|
| 671,830 | 4/1901 | Loesser............................ | 125/30 R |
| 3,266,476 | 8/1966 | Swaab............................. | 125/30 R |

Primary Examiner—Harold D. Whitehead
Attorney, Agent, or Firm—Benjamin J. Barish

[57] ABSTRACT

A machine particularly useful for cutting diamonds comprises an improved arrangement for adjusting the diamond-carrying swingable arm laterally of the sawing disk, which arrangement includes a fixed guide member having a slot extending obliquely towards the rotary axis of the sawing disk, a movable guide member having a projection extending and guided by the oblique slot and movable by a threaded rod towards and away from the rotary axis of the sawing disk, and a further guide member formed with a second slot extending at a right angle to the sawing disk, which latter slot receives and guides a disk fixed to the pivotal mounting of the swingable arm.

9 Claims, 4 Drawing Figures

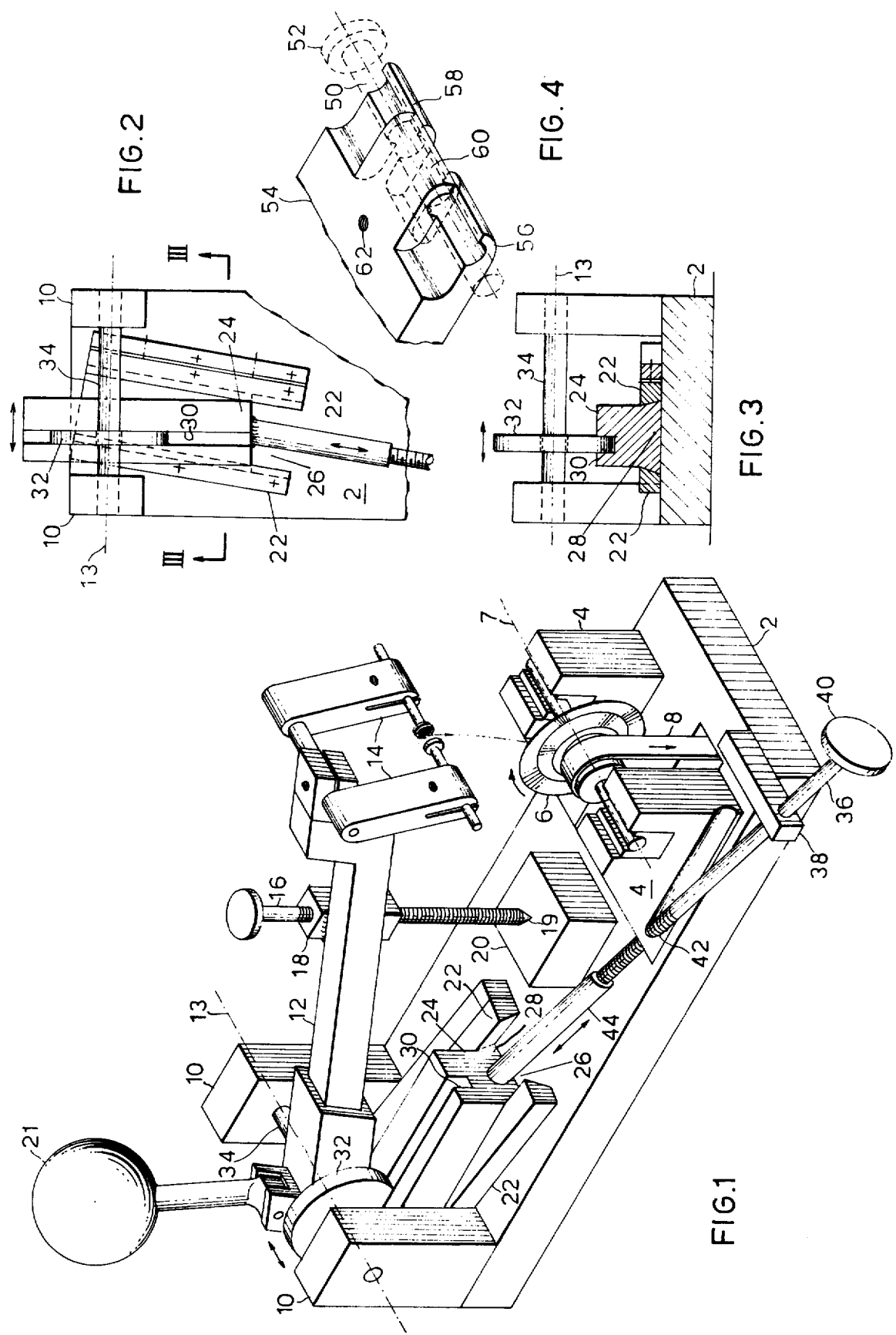

3,897,772

MACHINE FOR CUTTING PRECIOUS STONES

BACKGROUND OF THE INVENTION

The present invention relates to machines which are particularly useful for cutting diamonds and other precious stones.

The conventional diamond cutting machine includes a stationary frame rotatably mounting on its front end a sawing disk and pivotably mounting on its rear end a swingable arm adapted to carry the diamond between a paid of holders or dops, the swingable arm enabling the diamond to be brought into engagement with the sawing disk.

In such machines, it is very critical that the diamond be precisely positioned with respect to the sawing disk and that it be firmly held in position during the sawing operation, as any lateral movement of the diamond during the sawing operation may result in costly damage thereto. The commonly-used machine includes a set-screw mounting for adjusting the pivotal axis of the diamond-carrying swingable arm, but this is not entirely satisfactory since a relatively small amount of wear at the pivotal mounting results in a relatively large play at the diamond-carrying end, because the play is multiplied by the length of the arm.

An object of the present invention is to provide a machine having advantages in the above respects. While the invention is particularly useful in machines for cutting diamonds and other precious stones, it could obviously be used in other applications as well requiring precision in the positioning of a workpiece with respect to a tool.

SUMMARY OF THE INVENTION

According to a broad aspect of the present invention, therefore, there is provided a machine particularly useful for cutting diamonds and other precious stones, comprising: a stationary frame; a holder for rotatably mounting a tool on the frame about a rotary axis; a swingable arm pivotably mounted at one end on the frame about a pivotal axis parallel to the tool rotary axis and carrying a workpiece holder on its opposite end such as to enable bringing the workpiece into engagement with the tool; a fixed guide member fixed to the stationary frame; and a movable guide member mounted for movement with respect to the fixed guide member towards and away from the tool rotary axis. One of said guide members is formed with a first slot, and the other of said guide members is formed with a first projection received in said slot, both slot and projection extending towards the tool rotary axis at an oblique angle thereto. The movable guide member is also formed with a second slot extending towards the tool rotary axis at a right angle thereto. A second projection is carried by the swingable arm and is received in the second slot. The second projection is formed with a rounded surface to permit the projection to roll in the second slot during the pivoting of the swingable arm. The device further includes an adjusting device for adjustably moving the movable guide member towards and away from the tool rotary axis to adjustably shift the pivotably mounted end of the swingable arm axially of its pivotal axis.

In the preferred embodiment of the invention described below, the fixed guide member is formed with the oblique slot, and the movable guide member is formed with the first projection movable therein.

According to a further feature, the swingable arm is pivotably mounted by means of a cross-shaft fixed to the arm and pivotably mounted on the stationary frame, the second projection being constituted of a rounded member fixed to the cross-shaft and having its center of curvature coaxial therewith.

According to a further feature, the adjusting device includes a threaded rod, a knob carried at one end of the rod for rotating same, and a second threaded member engageable with the opposite end of the threaded rod and attached to the movable guide member such as to be moved along the oblique slot by the rotation of the threaded rod.

According to a still further feature, the workpiece holder includes a pair of dops for holding a precious stone therebetween.

Each dop includes a shaft formed with a bearing at one end for engaging the precious stone, and a clamp carried by the swingable arm and formed with a pair of spaced jaws engaging the shaft on one side and a third jaw engaging the shaft on the other side, the third jaw being aligned with the space between the pair of jaws.

BRIEF DESCRIPTION OF THE DRAWINGS

The invention is herein described, by way of example only, with reference to a preferred embodiment illustrated in the accompanying drawings, wherein:

FIG. 1 is a perspective view of a diamond cutting machine constructed in accordance with the invention;

FIG. 2 is a top plan view of the pivotal mounting of the diamond-carrying arm;

FIG. 3 is a sectional view along lines III—III of FIG. 2; and

FIG. 4 is a perspective view of one of the diamond-carrying dops.

DESCRIPTION OF THE PREFERRED EMBODIMENT

The diamond cutting machine illustrated in the drawings comprises a stationary frame or base 2 having at its forward end a pair of blocks 4 rotatably mounting a sawing disk 6 about a rotary axis 7, the disk being driven by a belt 8. The rear end of frame 2 is provided with another pair of blocks 10 pivotably mounting a swingable arm 12 about pivotal axis 13, parallel to rotary axis 7. The forward end of arm 12 carries a pair of holders or dops 14 for holding the diamond (not shown) in position to be sawn by the cutting disk 6. The machine further includes an adjustable screw 16 threadedly received within a nut member 18 carried by arm 12, the tip 19 of the screw bearing against a resilient block 20 to regulate the extent and speed of the downward movement of arm 12 during the diamond-sawing operation. A counter-weight 21, fixed to arm 12 on the opposite side of its pivotal axis 13, controls the pressure applied by the diamond against the cutting disk 6.

The foregoing elements, insofar as mentioned above, are generally known in diamond cutting machines, and therefore further details are not deemed necessary.

According to the present invention, the novel machine is provided with an arrangement for precisely positioning the diamond-carrying arm 12 with respect to the sawing disk 6, and for firmly holding the arm and the diamond carried thereby in position during the sawing operation to prevent any lateral movement of the diamond which is liable to damage it.

For this purpose, the machine illustrated includes a guide block 22 (which may be constituted of a pair of blocks as shown in FIG. 3) fixed to stationary frame 2 at its rear end, and a movable guide block 24 movable within and guided by block 22. Fixed block 22 is formed with a slot 26 extending towards the rotary axis 7 of the cutting disk 6 but at an oblique angle with respect to that axis. The movable guide member 24 is formed with a depending projection or rib 28 movable within and guided by oblique slot 26. The upper face of movable block 24 is formed with a second slot 30 which extends at a right angle to the rotary axis 7 of cutting disk 6, and to the pivotal axis 13 of arm 12. Received within slot 30 is a disk 32 fixed to a cross-shaft 34 fixed to arm 12, the cross-shaft being pivotably mounted between the pair of supporting blocks 10 about pivotal axis 13. Disk 32 is coaxial with respect to cross-shaft 34 and its pivotal axis 13.

The machine further includes an adjusting device for adjustably moving block 24 towards and away from the sawing disk rotary axis 7, to adjustably shift the pivotably mounted end of the diamond-carrying arm 12 axially of its pivotal axis 13, i.e., laterally of the sawing disk 6. For this purpose, the machine includes a threaded rod 36 rotatably supported within an apertured mounting plate 38 fixed to frame 2. The outer end of rod 36 carries a knob 40. The inner end of rod 36 passes through an alignment opening 42 formed in one of the blocks 4 rotatably mounting the sawing disk 6, and is threadedly received within an internally-threaded rod 44 attached to the movable guide block 24. Rods 36 and 44 are maintained in alignment by alignment opening 42 with oblique slot 26 of the fixed guide block 22.

It will thus be seen that when knob 40 is rotated in one direction, rod 36 causes block 24 to move within oblique slot 26 towards the sawing disk rotary axis 7. This also shifts the block laterally (leftwardly in FIG. 1) with respect to the sawing disk. This shifting of block 24 causes disk 32, received within slot 30 of block 24, to be shifted in the same direction. Since disk 32 is fixed to cross-shaft 34 of the diamond-carrying arm 12, the latter arm is shifted axially of its pivotal axis 13, i.e., laterally of the sawing disk 6.

It will thus be seen that the lateral position of the diamond with respect to the sawing disk may be precisely adjusted in a very simple manner by means of a knob 40, and that this position is firmly maintained with a minimum of play during the sawing operation.

The construction of each diamond-carrying dop is shown in FIG. 4. It includes a mounting shaft 50 formed at one end with a bearing 52 having a conical recess or socket for receiving the diamond (not shown). The shaft is secured by a clamp 54 carried by arm 12. The clamp includes a lower part formed with a pair of spaced jaws 56, 58, and with an upper part formed with a single jaw 60 aligned with the space between the two jaws 56, 58. The dop is securely clamped between the two parts by a fastener received in a threaded opening 62 passing through both parts, with jaws 56, 58 engageing one side of its shaft 50, and jaw 60 engageing the other side.

Many variations, modifications and other applications of the illustrated embodiment will be apparent.

What is claimed is:

1. A machine particularly useful for cutting diamonds and other precious stones, comprising: a stationary frame; a holder for rotatably mounting a tool on the frame about a rotary axis; a swingable arm pivotably mounted at one end on the frame about a pivotal axis parallel to the tool rotasry axis and carrying a workpiece holder on its opposite end such as to enable bringing the workpiece into engagement with the tool; a fixed guide member fixed to the stationary frame; a movable guide member mounted for movement with respect to the fixed guide member towards and away from the tool rotary axis; one of said guide members being formed with a first slot, and the other of said guide members being formed with a first projection received in said slot, both slot and projection extending towards the tool rotary axis at an oblique angle thereto; said movable guide member being formed with a second slot extending towards the tool rotary axis at a right angle thereto; a second projection carried by the swingable arm and received in the second slot; said second projection being formed with a rounded surface to permit the projection to roll in the second slot during the pivoting of the swingable arm; and an adjusting device for adjustably moving the movable guide member towards and away from the tool rotary axis to adjustably shift the pivotably mounted end of the swingable arm axially of its pivotal axis.

2. A machine according to claim 1, wherein the fixed guide member is formed with the oblique slot, and the movable guide member is formed with the first projection movable therein.

3. A machine according to claim 1, wherein the swingable arm is pivotably mounted by means of a cross-shaft fixed to the arm and pivotably mounted on the stationary frame, the second projection being constituted of a rounded member fixed to the cross-shaft and having its center of curvature coaxial therewith.

4. A machine according to claim 1, wherein said adjusting device includes a threaded rod, a knob carried at one end of the rod for rotating same, and a second threaded member engageable with the opposite end of the threaded rod and attached to the movable guide member such as to be moved along the oblique slot by the rotation of the threaded rod.

5. A machine according to claim 4, wherein the threaded rod extends parallel to the oblique slot, and the second threaded member is a second threaded rod fixed to the movable guide member also parallel to the oblique slot.

6. A machine according to claim 5, wherein the stationary frame includes a fixed alignment member having an aperture therethrough through which one of the threaded rods passes for maintaining alignment thereof with the oblique slot.

7. A machine according to claim 1, wherein the workpiece holder includes a pair of dops for holding a precious stone therebetween.

8. A machine according to claim 7, wherein each dop includes a shaft formed with a bearing at one end for engageing the precious stone, and a clamp carried by the swingable arm and formed with a pair of spaced jaws engageing the shaft on one side and a third jaw engageing the shaft on the other side, the third jaw being aligned with the space between the pair of jaws.

9. A machine according to claim 7, wherein the working tool is a cutting disk for cutting precious stones.

* * * * *